Patented Nov. 26, 1935

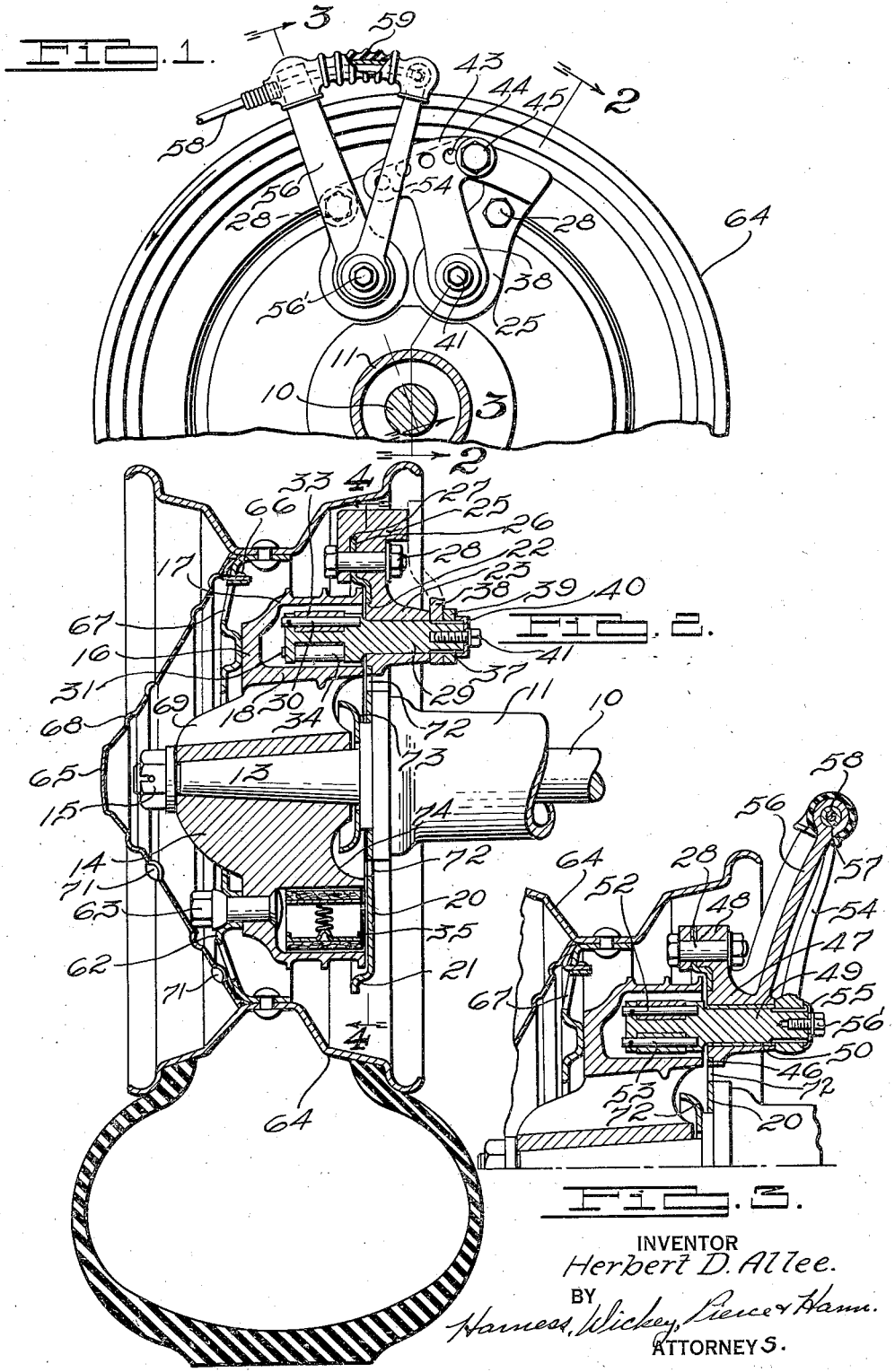

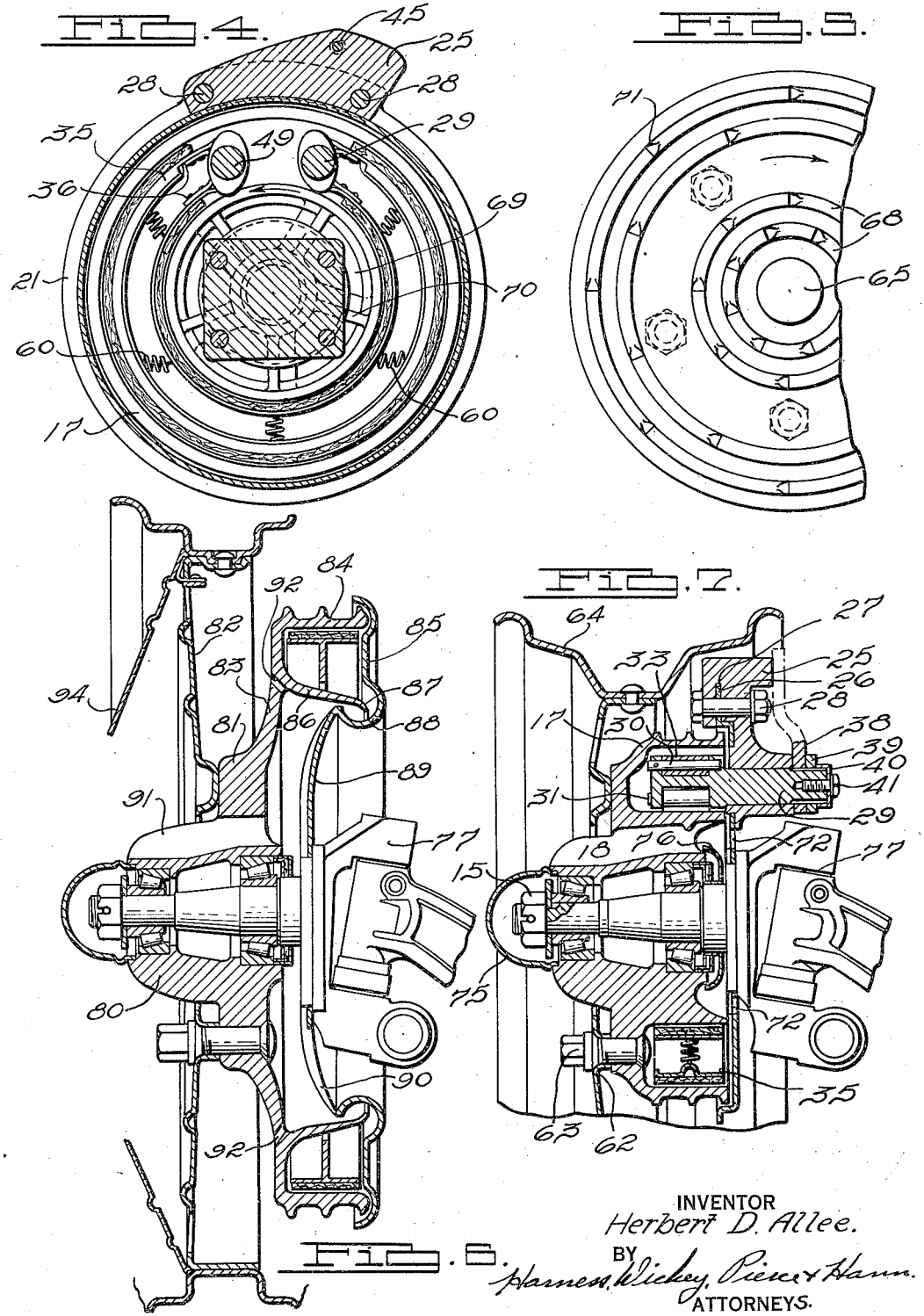

2,022,174

UNITED STATES PATENT OFFICE 2,022,174

WHEEL AND BRAKE MECHANISM

Herbert D. Allee, Detroit, Mich.

Application February 7, 1933, Serial No. 655,612

9 Claims. (Cl. 188—74)

The invention relates to a wheel and brake mechanism therefor, and it has particular relation to a wheel and brake mechanism for motor vehicles wherein a pneumatic tire is mounted on the wheel.

One object of the invention is to provide an improved wheel and brake mechanism for use in conjunction with low pressure types of balloon tires particularly, and improved means for dissipating the heat from around the brake, which ordinarily is a very detrimental factor owing to the proximity of the tire thereto.

Another object of the invention is to provide an improved wheel hub wherein the brake drum is integral therewith and is arranged advantageously with respect to the mounting of a rim-supporting member on the hub.

Another object of the invention is to provide means for preventing the throw of grease or lubricant from the inner side of the wheel into and around the brake mechanism so as to eliminate the depositing of grease on the usual friction lining provided.

Another object of the invention is to provide an improved brake mechanism which will operate uniformly in applying the brake, and which will be returned to its inoperative position with substantially the same force regardless of brake adjustment or any other variable movement of the brake applying elements.

Another object of the invention is to provide an improved brake mechanism for the front wheel of a motor vehicle, wherein the brake mechanism will be substantially unaffected by any steering movement of the wheel.

Other objects of the invention will become apparent from the following description, accompanying drawings and the claims hereinafter set forth.

For a better understanding of the invention reference may be had to the drawings, wherein:

Figure 1 is a fragmentary, side elevational view of a wheel constructed according to one form of the invention and particularly illustrating adjusting and operating means for the brake.

Fig. 2 is a cross-sectional view taken substantially along the line 2—2 of Fig. 1 and additionally illustrating the complete wheel.

Fig. 3 is a cross-sectional view taken substantially along the line 3—3 of Fig. 1.

Fig. 4 is a cross-sectional view taken substantially along the line 4—4 of Fig. 2.

Fig. 5 is a side view of the construction shown by Fig. 2, taken from the left side thereof, with the omission, however, of the tire and rim.

Fig. 6 is a diametrical, cross-sectional view of a wheel constructed according to another form of the invention.

Fig. 7 is a fragmentary cross-sectional view similar to Fig. 2, but illustrating a front wheel arrangement instead of a rear wheel.

Referring to Fig. 2, a rear axle of a motor vehicle is indicated at 10, the housing therefor at 11, and a tapered wheel bearing portion of the axle at 13. On this bearing portion a hub 14 is mounted, and a conventional nut 15 and washer on the threaded end of the axle are employed for securing the hub thereon. The hub has a substantially radial portion 16 projecting outwardly therefrom, and the outer edge of this portion terminates in an axially directed brake drum portion 17 which preferably has circumferentially extending ribs on its outer surface for heat dissipation purposes. Radially inward of the drum portion 17, the outer surface of the hub provides a brake drum portion 18 and it will be noted that such portions are substantially parallel and commensurate in axial position. At the inner side of the wheel, a backing plate 20 is operatively secured to the axle housing 11, and this backing plate extends radially slightly beyond the brake drum portion 17 and terminates in a lip 21 extending slightly thereover in an axially outward direction.

Now as best shown by Figs. 2 and 4, the backing plate 20 at one point is provided with an opening 22, which receives one end of a boss portion 23 of an arm 25 which has a slotted portion 26 for receiving a slightly extended peripheral edge portion 27 of the backing plate. The arm is secured in position and to such slightly extended peripheral edge portion of the backing plate, by a pair of bolts 28 passing through the arm and such edge portion of the plate. Thus the arm is rigidly held in position, with the boss 23 in alignment with the opening 22 in the backing plate. The boss 23 is apertured and receives the trunnion portion 29 of a brake band adjusting device, and as best shown by Fig. 2, the inner end of the trunnion projects between the drum portions 17 and 18. Such inner portion of the trunnion is provided with axially disposed pins 30 and 31, offset on each side of the axis of the trunnion 29, which receive looped ends 33 and 34 of outer and inner brake bands 35 and 36 extending circumferentially between the brake drum portions. It will be appreciated that upon turning the trunnion 29, the pin 30 and brake band 35 secured thereto will be moved circumferentially in one direction whereas the pin 31 and brake band 36 secured thereto, will be moved circumferentially in the other direction. The brake bands are provided with friction lining for engagement with the drum portions 17 and 18, respectively.

For adjusting the bands by moving the looped ends 33 and 34 thereof, the outer end of the trunnion 29 projects beyond the outer end of the boss 23 and is axially serrated as indicated at 37. This axially serrated end receives an arm 38 having an opening complementary to the serrated portion 37, so that upon turning the arm, the trunnion turns therewith. The arm is maintained on the trunnion by a washer 39, a cap 40 and a machine bolt 41 threaded into the end of the trunnion and extending through the cap. The outer end of arm terminates in an arcuate segment 43, as shown by Fig. 1, having a plurality of openings 44 adapted selectively to receive a machine bolt 45 threaded into the outer end of arm 25. It will be appreciated that by removing the bolt 45, the arm 38 may be rotated in either direction and that it may be secured in any desired position, depending upon the adjustment of the brake band, by inserting the bolt 45 into the proper one of the openings 44.

Closely adjacent to the adjusting device, and at the opposite ends of the bands, the backing plate is provided with an arcuate opening 46, as shown by Fig. 3, which receives the inner end of a boss 47 forming part of an oscillatory arm 48. This arm is oscillatory on one of the bolts 28 secured to the backing plate and the arm 25, and it will be noted that the inward side of the arm 25 or the inner side of the bifurcated portion thereof is omitted at this point to accommodate the pivoted end of arm 48. The boss 47 of arm 48 is apertured to receive a trunnion portion 49, and preferably a sleeve bearing 50 is disposed in the aperture to receive the trunnion and thereby avoid friction as much as possible. The inner end of the trunnion projects between the brake drum portions 17 and 18 and similarly is provided with offset pins 52 and 53 for receiving looped ends of the bands 35 and 36, respectively. Thus, by turning the trunnion, one pin and the end of the band connected thereto will be moved circumferentially in one direction while the other pin and the band connected thereto will be moved circumferentially in the other direction. It will be appreciated that the arcuate slot 46 in the backing plate permits the oscillatory movement of the arm 48.

The outer end of the trunnion is serrated as previously mentioned in connection with trunnion 29 of the adjusting device, and this serrated portion receives a serrated opening of an operating arm 54 which is maintained on the end of the trunnion by a cap 55 and a bolt 56 threaded through the cap and into the end of the trunnion. Hence, by turning the arm 54, the trunnion may be rotated in the boss portion 47 of arm 48. The boss portion 47 has an integral arm 56 extending upwardly although normally at an angle to arm 54 and terminates at its upper end in an opening 57 which receives the covering for a Bowden wire 58 that is connected at its end to the upper end of arm 54. The upper ends of the arms and the Bowden wire between them, are enclosed by a dirt and grease excluding, bellows type of rubber sleeve 59 having end cap portions extending over ends of the arms, as shown by Fig. 1.

In operating a brake of this character, when the wire 58 is pulled, the arm 54 will turn the trunnion 49 and cause expansion of the outer band into engagement with the drum portion 17 and contraction of the inner band against the drum portion 18. In the event, however, that one band engages its drum surface first or more forcefully than the other band engages its drum surface, the arms 48, 54 and 56, as a unit may pivotally move about the bolt 28, until the looser band engages its brake drum more forcefully, when this oscillatory movement of the arm 48 will more or less cease and then if the pull is continued on the Bowden wire, the arm 54 will continue to turn the trunnion about its axis, thereby tightening both bands. This arrangement therefore comprises an equalizing structure so that both bands will be applied with substantially the same force regardless of wear on either band or any other condition which might tend to cause one band to engage its drum before the other band engages its drum.

As best shown by Fig. 4, tension springs 60 are provided between the bands and are connected to them for normally urging the bands into their inoperative position. During adjustment of the bands, it will be appreciated that they will move circumferentially in opposite directions and farther apart radially thereby taking up for wear, but that the ends of the bands adjacent the adjusting device will move circumferentially more than the ends of the bands at the operating device. By angling the springs progressively less from the adjusting end, an arrangement would be obtained wherein during adjustment the springs would turn toward radial positions but since the greater turning springs would be the greater angled, substantially no greater tension on the springs would occur as the bands would separate further during turning of the springs. However, during operation of the brake, the bands would move circumferentially in directions the reverse of those obtained in adjustment so it is preferable to have the springs nearer the operating and angled in the opposite direction to the springs nearest the adjusting device, and angled more progressively toward the operating end. At the intermediate point it seems that a substantially radial spring is preferable in view of the adjusting and operating factors mentioned.

This arrangement of springs insures substantially equal tension on the springs during adjustment and operation so that at all times the springs urge the bands into their inoperative positions with substantially a uniform force.

For supporting a rim on the hub, a wheel disc 62 may be provided which is secured to the radial portion 16 of the hub by conventional bolts 63 and the outer periphery of the disc may be riveted or otherwise secured to a pneumatic tire supporting rim 64. It will be noted that the hub 14 projects outwardly through the central opening of the disc. The outer side of the wheel preferably is covered by a conical cover plate 65 which may have adjacent its outer periphery, inwardly directed, resilient latching beads 66 adapted to pass through circumferentially spaced openings 67 in the outer portion of the disc, and to snap into latched position against the inner side of the disc at the radially outer side of the opening. These beads are of such character that the cover may be easily snapped on or snapped off of the disc. The cover has a plurality of circumferentially extending corrugations 68 and these are arranged in spaced relation along the conical walls of the cover.

It has been previously mentioned that the hub and brake mechanism are particularly designed for use in conjunction with the large, low pressure type of balloon tires which are small in inside diameter. This means that the overall size of the wheel is large as compared to the diameter of brake permitted and that the hub must be arranged in a relatively small space and the brake mechanism in close proximity to the tire rim. It also means that the diameter of the brake usually must be smaller and in this connection it is desired to point out that the double brake band and drum structure is particularly desirable in a wheel of this character as together they increase the braking surface and power of the brake sufficiently to compensate for the decrease in diameter. Also, owing to this proximity of the brake to the rim, there is considerable danger of the relatively high heat generated in application of the brake, affecting the tires and causing material disintegration. To offset this, the wheel is provided with an air circulation arrangement which will now be described. At circumferentially spaced points, as best shown by Figs. 2 and 4, the hub 14 is provided with axially extending openings 69 which are separated by walls 70 of spoke-like formation, that have their opposite faces angled with respect to the axis of the wheel so as to provide a fan-like effect. Thus, during rotation of the wheel, air is drawn through the hub. The cover 65 and particularly the corrugated portions 68 thereof, as best shown by Fig. 5, are stamped in at circumferentially spaced points as indicated at 71, to provide louvre openings that, during rotation of the wheel, catch the air and cause it to be forced inwardly through the cover. As the air is so forced through the hub, it escapes through the backing plate 20 in an axial direction through openings 72 in the latter, although some air may flow radially and outwardly between the backing plate and the drum portions 17 and 18. Also, air drawn through the cover 65 will flow axially through the openings 67 in the wheel disc, over the drum portion 17. Hence, it will be appreciated that space around the drum portions is efficiently cooled by the air circulating system. A cup-shaped plate 73 may be operatively secured to the housing 11 in an annular recess 74 at the inner side of the hub to prevent grease or lubricant at the outer end of the housing from centrifugally being thrown radially into the brake. As thrown out, this grease or lubricant may drain through the cored openings in the hub.

The construction shown by Fig. 7 is substantially the same as that described previously, with the exception that it is employed in conjunction with one of the front wheels of a vehicle. The cover disc 65 in this construction, however, has not been illustrated and it will be appreciated that it may be employed if desired. In the front wheel it is of course usual to use a cap indicated at 75 over the securing nut on the end of the spindle, and to place grease or lubricant therein for lubricating the bearings between the spindle and the hub. Occasionally this grease escapes past the rear side of the wheel between the backing plate and the wheel and, owing to centrifugal force, is thown out into the vicinity of the brake where it sometimes becomes deposited on the braking lining. To avoid this, a cup ring 76 such as the ring 73 previously described, is mounted on the spindle and is so shaped that any grease thrown out in the manner indicated, is prevented from being thrown into the space between the brake drum portion of the hub and the backing plate. This grease will drain through the cored openings in the hub.

In a front wheel of this character, it is conventional to use a king pin construction indicated generally at 77 upon which the wheel generally turns during steering and, in view of this fact, it is desirable to place the brake operating mechanism as shown by Fig. 3, in substantially vertical alignment with the king pin so that very little movement of the operating means for the brake will occur during steering of the wheel. This will prevent undesirable displacement of the operating mechanism and avoid bending of the Bowden wire and will in general maintain the effective length of the wire without causing any application of the brake during steering as a result of tensioning of the wire.

Fig. 6 illustrates a wheel more particularly useful in conjunction with the larger and higher pressure type tires. In this construction the hub indicated at 80 has a radial portion 81 to which a rim-supporting disc 82 may be secured, and an extension 83 of the radial portion which terminates at its outer edge in a brake drum 84. Only one brake band is illustrated in this construction and this band may be anchored at one end to a backing plate 85 secured on the stationary part of the front axle as shown, and operating means may be employed on the backing plate for moving the other end of the band circumferentially to apply the brake. Radially inward of the drum 84, the portion 83 of the hub has a flanged portion 86 extending at an angle to the axis of the wheel, and this portion terminates in a slightly greater angled lip 87 which projects into an annular, arcuate portion 88 of the backing plate, in spaced relation to the wall thereof. Between this arcuate portion and the stationary part of the axle, the backing plate is generally curved in a flaring manner as indicated at 89 and at circumferentially spaced points is provided with openings 90 for allowing air to pass axially through the plate. The hub 80, similarly to the hub previously described, projects through the central opening in the wheel disc 82, and has fan like blades 91 for forcing air axially through the hub and backing plate. Adjacent the flange 86, the portion 83 of the hub has circumferentially spaced openings 92 which are also angled with respect to the axis of the wheel.

During rotation of the wheel, the air is drawn axially through the hub and by the fan-like blades 91, is then deflected radially and outwardly and then axially through the openings 90 in the backing plate. Also some of the air may flow through the openings 92 and through the arcuate space defined by the arcuate portion 88 of the backing plate, and radially past the inner side of the brake and axially over the outer surface of the brake drum, the outer periphery of the backing plate being conventionally deflected axially over the brake drum, thereby deflecting this air in the proper direction. The general arrangement of the flange 86 and the backing plate adjacent thereto, is such that dirt, grease and the like, instead of being centrifugally thrown to a position where it is apt to get on the brake band lining, is thrown into proximity to the openings 92 where it will pass therethrough. This arrangement permits circulation of air in the manner specified around the brake drum and even within the drum, without much chance of dirt or grease moving into a position within the brake drum or on the lining of the brake band, so as to interfere with the operation of the brake. This construction may also be provided with a cover disc indicated at 94 which may have corrugations such as previously described, and louvres for catching and drawing air through the cover plate, and the wheel disc may have openings 95 for latching he cover on the disc and allowing air to flow axially over the brake drum.

It will be appreciated that a wheel has been provided which may be maintained at a lower temperature, thus preserving the tire and particularly in a wheel having the low pressure, small diameter tire wherein the brake necessarily must be placed in close proximity to the tire rim. It will also be appreciated that an improved brake has been employed wherein substantially equal forces return the brake bands to their inoperative position regardless of adjustment or operation of the bands. Moreover, a unitary hub and brake drum has been provided which is of simple construction. The invention also involves an improvement in wheels and brakes for preventing the depositing of grease or other foreign matter on the brake linings of the brake bands.

Although more than one form of the invention has been illustrated and described in detail, it will be apparent to those skilled in the art that various modifications may be made without departing from the scope of the appended claims.

I claim:

1. In combination, a wheel hub having a continuous outer surface for use as a brake drum, and a brake element cooperating with such surface, said hub having axially directed openings radially inward of the surface for allowing air to flow axially through the hub, said openings being separated by walls having surfaces disposed in planes angled to the wheel axis to provide a fan effect during rotation of the wheel.

2. In combination, a wheel having a hub provided with an axially directed brake drum portion thereon, a stationary member, a backing plate mounted on the stationary member and substantially closing that side of the hub to which the drum is open and a brake element on the backing plate for cooperating with the drum, said hub and backing plate having openings for allowing air to flow axially through the wheel, certain of the openings being defined by wall surfaces disposed in planes angled to the wheel axis.

3. In combination, a stationary member, inner and outer rotary brake drums, inner and outer brake bands for engagement with the drums respectively, means for anchoring one end of the bands on the stationary member, means for moving the bands respectively in opposite circumferential directions and against the drums, and means normally urging the bands into their inoperative positions with a substantially uniform force regardless of the normal movement of the bands.

4. In combination, a stationary member, inner and outer rotary brake drums, inner and outer brake bands for engagement respectively with the drums, means for anchoring one end of the bands on the stationary member, means for moving the bands respectively in opposite circumferential directions and against the drums, and springs connecting the bands and normally urging them into their inoperative positions, said springs being so positioned that they urge the bands toward their inoperative positions with substantially the same force regardless of normal movement of the bands.

5. In combination, radially spaced rotary brake drum portions, a pair of brake bands adapted to cooperate with the drum portions respectively, a stationary member, means anchoring one end of the bands on the stationary member, an oscillatory member on the stationary member adjacent the other ends of the bands, a trunnion journaled in a portion of the oscillatory member, means connecting the latter ends of the bands to the trunnion at points offset with respect to the axis of the trunnion, an arm on the trunnion for moving it, an arm on the oscillatory member at one side of and directed at an angle to the other arm, and flexible operating means connected to the first arm and movably extending through the second arm.

6. In combination, radially spaced, rotary brake drum portions, a pair of brake bands adapted to cooperate with the drum portions respectively, a stationary member, means anchoring one end of the bands on the stationary member, means operatively connected to the other ends of the bands for moving them into engagement with the drum portions and equalizing their action, said means including a pair of separated arms, flexible means connected to one arm and movably passing through the other, and a flexible covering for the ends of the arms and the flexible means between them.

7. A wheel comprising a hub having brake drum portions, a rim supporting member mounted on the hub, a covering disc connected to the rim supporting member adjacent its outer periphery and covering the outer side of the wheel, said rim supporting member, disc, and hub having openings for allowing air to circulate axially past the brake drum portions.

8. A wheel comprising a hub, a rim-supporting wheel member removably mounted on the hub and having a central opening receiving the latter, a brake drum at the inner side of the wheel member, and means including axial openings in the hub inwardly of the inner peripheral edge of the wheel member for allowing air to circulate laterally through the wheel and over the brake.

9. A wheel comprising a hub, a rim-supporting wheel member mounted on the hub, a brake drum at the inner side of the wheel member, a covering disk at the outer side of the wheel member, and means including openings through the disk and wheel member for allowing air to circulate laterally through the wheel and axially past the radially inner and outer portions of the brake drum.

HERBERT D. ALLEE.